Nov. 29, 1932.  R. G. FESSENDEN  1,889,328
COVER FASTENING FOR WOODEN CONTAINERS AND METHOD OF MAKING THE SAME
Filed July 1, 1931
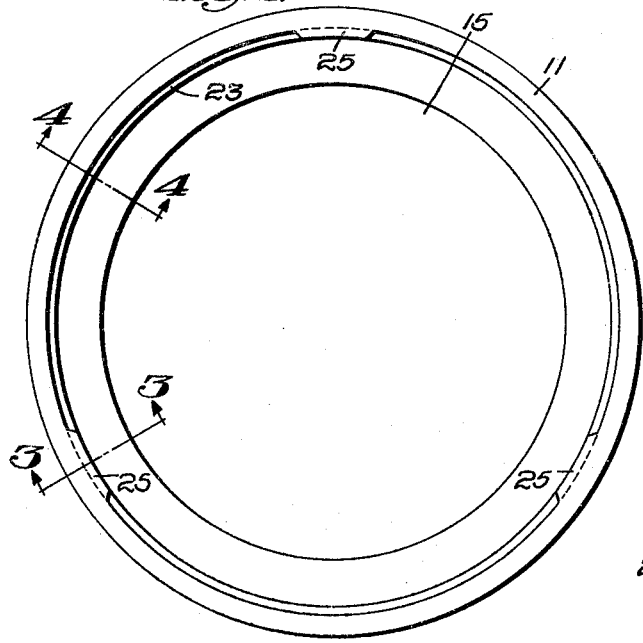
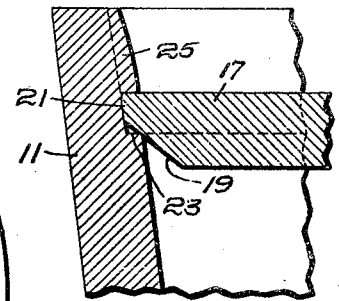
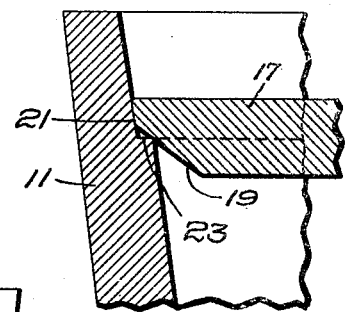
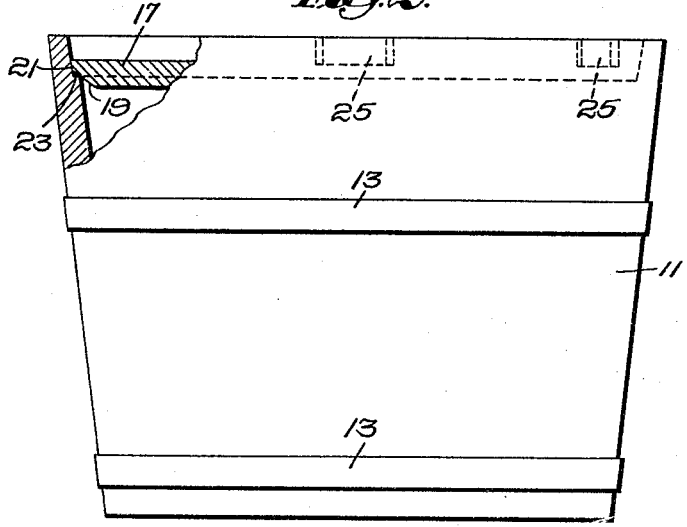
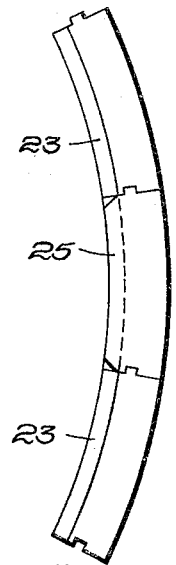
Inventor:
Robert G. Fessenden Patented Nov. 29, 1932

1,889,328

UNITED STATES PATENT OFFICE

ROBERT G. FESSENDEN, OF TOWNSEND, MASSACHUSETTS

COVER FASTENING FOR WOODEN CONTAINERS AND METHOD OF MAKING THE SAME

Application filed July 1, 1931. Serial No. 548,066.

This invention relates to wooden containers and to means and methods utilized for applying, holding and removing covers of such containers.

While the invention may have application to containers of widely varying types and may be employed for different purposes, for illustration, it is here shown as embodied in a pail or bucket intended to be employed particularly for the transportation and storage of jams, jellies or other products of a semi-liquid nature, and where it is required that the cover effectively close the top of the container while being securely held against displacement under pressure from within or without, and where the cover furthermore should be susceptible of easy removal.

One object of the invention, among others, is to provide a cover fastening such that the cover may be readily and easily applied and held firmly in closed position without the necessary use of nails, cleats, metal bands or like fastenings and such that the release and removal of the cover may be effected by a simple operation.

The invention will be best understood by reference to the following description when taken in connection with the accompanying illustration showing one specific embodiment thereof, while its scope will be more particularly pointed out in the appended claims.

Referring to the drawing,

Figure 1 is a plan view of the open end of a container in the form of a pail or bucket embodying one type of the invention, the cover being omitted;

Figure 2 is a side elevation of the container shown in Figure 1 partially in section, the cover being in place;

Figure 3 is a sectional detail in elevation taken on the line 3—3 in Figure 1, but on a larger scale showing the cover in place;

Figure 4 is a similar section on the line 4—4 in Figure 1; and

Figure 5 is a plan view showing one of the three crozed staves with the two adjoining uncrozed staves.

Referring to the drawing, the container 11 which may be provided with a bale or handle, not shown, is in the form of a pail or bucket formed of staves preferably of soft wood such as pine and held together by cleats or bands 13, the container having a closed bottom 15 held in place by the usual groove or croze, or in any other desired manner, the bottom of the container shown being of somewhat lesser diameter than the top. The container is provided with a cover 17 having a flat top extending substantially to its peripheral edge, and a flat bottom having a lower beveled edge 19 and a peripheral edge 21 which has a slightly acute angled relation to the flat top. When the cover is applied, its lower beveled edge rests upon a shoulder 23 on the inner walls of the pail just below the mouth thereof open and unobstructed from above and formed by cutting out the material at the tops of certain of the staves, the walls being cut back at an angle approximating the angle of the cover edge 21. This provides an aperture immediately above the shoulder of approximately the outside diameter of the cover.

To hold the cover in position, however, the unobstructed opening above the shoulder 23 is interrupted at certain points or areas, herein at three such points by the formation of a chime provided by the overhanging shoulder 25. This is produced by prolonging the cut forming the shoulder 23 through such areas in the form of a croze or groove (Figure 3) conforming in width and diameter substantially to the bead or edge of the cover 17 and leaving the shoulder or chime 25 which overlies the peripheral edge of the cover and holds it in place. The inner walls of each shoulder are preferably beveled slightly upward and outward as shown in Figure 3. This provides a cover-receiving formation in the container comprising a croze formed in the inner walls of the container at a plurality of separated areas presenting at intermediate points an open seating shoulder for the cover, the base of the croze at each of the three areas being cut on the same line as the base of the shoulder.

While other arrangements may be adopted, in the illustrated embodiment of the invention, the croze is formed in three of the staves only, extended substantially the width of the stave, the crozed staves being so selected that they occupy in plan the relation of the three apexes of an isosceles triangle, the intermediate inner walls of the pail and the intermediate staves having merely the open or unobstructed shoulder 23 on which the cover is designed to rest.

With the pail filled, the cover is applied to the open mouth of the bucket so that it rests on the inner beveled walls of the three shoulders 25. In this position it is then forcibly depressed, the soft wood of the shoulders being sufficiently compressible to yield or squeeze temporarily inwardly under the pressure of the cover edges to permit the latter to move down and snap into the position shown in Figure 3 with its beveled lower edge seating against the edge of the underlying shoulder 23 and its peripheral edges locked and held fast by the overlying bulging walls of the three shoulders 25.

The upper ends of the crozed staves themselves are firm and rigid, being preferably locked to the adjoining uncrozed staves by the tongue and groove connections shown in Figure 5, and firmly held by the bands 13 so that when the cover is in place the crozed staves are substantially unyielding under pressure from within or without, providing a secure attachment for the cover, and the application of the cover being effected through the inherent compressibility or resiliency of the soft wood of which the shoulders 25 are composed.

This construction not only provides a simple and easy method of applying and securing the cover in the first instance without the use of nails, cleats, bands or the like, but also makes it possible to free and remove the cover in an equally simple fashion.

To remove the cover from the illustrated form of pail and render it easily replaceable and removable to permit repeated opening and closing of the pail, as by the ultimate consumer it is only necessary to cut or chip away the wood comprising one of the three shoulders 25 which may be readily done by applying a chisel, knife or other sharp instrument to the upper edge of one of the crozed staves, the only cut required being with the grain and for the width of one stave only. Since the three crozed staves are in the isosceles triangle relation referred to, the removal of a single shoulder permits the cover to be freed and removed through the exertion of a slight lifting force which may be applied through a ring or handle on the cover (not shown). If all the contents of the pail are not removed at one time, this construction also permits the cover to be replaced after it has been removed in the described manner, the two remaining shoulders providing a sufficient grip on the cover to hold it positioned on its seat.

To remove the cover from the pail without damaging the cover or the croze, as for inspection of the contents after storage or in other situations where mutilation of the pail must be avoided, it is only necessary to insert a tool constructed on the principle of a shoehorn under a shoulder of one of the crozes and to pry the cover loose so that it can be lifted. In this operation neither the cover nor the croze is damaged, nor is there any spreading of the joints between the staves, because all yielding required in freeing the cover in this way is supplied, as in the insertion of the cover, by the inherent compressibility or resiliency of the wood of which the cooperating parts are made to allow the crozed ends of the staves to retreat slightly to permit passage of the head.

While I have herein shown and described for purposes of illustration one specific embodiment of the invention, it is to be understood that extensive deviations may be made in the form and relative arrangement of the parts and in the shape and type of container to which it may be applied, all without departing from the spirit thereof.

I claim:

1. A wooden container formed of a series of staves locked each to the other by a tongue and groove connection and having a cover for one end thereof, said container having a cover-receiving formation comprising an open seating shoulder unobstructing the application of the cover to its seat thereon and extending around the major portion of the inner periphery of the container, three separated staves of said series being formed with a croze the base of which forms a prolongation of said seating shoulder and in which croze the cover edges are adapted to be inserted, presenting thereby at widely separated intervals a shoulder having outwardly and upwardly beveled walls adapted to overlie the cover when seated, the material of said shoulders being adapted to compress when the cover is forced to its seat but to retain the cover when seated, said shoulders having the relative position in the inner periphery of the container of the apexes of an isosceles triangle whereby the removal of one overhanging shoulder permits the removal of the cover.

2. A wooden container formed of a series of staves locked each to the other by a tongue and groove connection and having a cover for one end thereof, said container having a cover receiving formation comprising an open seating shoulder extending over the major portion of the inner periphery of the container, on which shoulder the edges of the cover are adapted to seat, said formation presenting at widely spaced intervals a croze in which the cover edges are adapted to be inserted, each croze having an overlying shoulder with beveled walls adapted to compress when the cover is forced thereagainst to its seat but to retain the cover when the latter is seated.

3. A wooden container formed of a series of staves and having a cover for one end thereof, said container having a cover-receiving formation comprising a croze formed in three separated ones of the staves in which croze the edges of the cover are adapted to be inserted, and comprising further an open seating shoulder formed in the intermediate remaining staves on which shoulder the lower edge of the cover is adapted to seat, the crozed staves having the relative position of the apexes of an isosceles triangle whereby the removal of the overhanging shoulder of one croze permits the removal of the cover.

4. A wooden container having a cover for one end thereof, said container having a cover-receiving formation comprising three widely separated areas on its inner periphery, each of said areas presenting a croze adapted to have inserted therein the edges of the cover, said croze-presenting areas being separated by areas presenting an open seating shoulder for the cover whereby the removal of the overhanging shoulder of one croze permits the removal of the cover.

5. A wooden container formed of a series of staves and having a cover for one end thereof, certain staves only presenting a croze in which the edges of the cover are adapted to be inserted and the intermediate staves having an open seating shoulder on which the cover is adapted to seat, said croze-presenting-staves being so distributed with reference to said open-shoulder-presenting staves that removal of the overhanging shoulder of one croze permits the removal of the cover.

6. A wooden container formed of a series of staves and having a cover for one end thereof, certain staves only presenting a croze in which the edges of the cover are adapted to be inserted and the intermediate staves having an open seating shoulder on which the cover is adapted to seat, said croze-presenting-staves being so distributed with reference to said open-shoulder-presenting staves that removal of less than half the overhanging shoulders of the crozes eliminates obstruction to removal of the cover throughout more than half of its periphery and thus permits removal of the cover.

7. A wooden container having a cover for one end thereof, said container having a cover-receiving formation comprising a plurality of separated areas on its inner periphery presenting each a croze adapted to have inserted therein the edges of the cover, said croze-presenting areas being separated by areas presenting an open seating shoulder for the cover and being so distributed with reference to said open-shoulder-presenting areas that removal of not more than half the overhanging shoulders of the crozes eliminates obstruction to removal of the cover throughout more than half of its periphery and thus permits removal of the cover.

8. The method of constructing a covered wooden container adapted to be opened as hereinafter set forth which consists in forming an open seating shoulder around the major part of the inner periphery of the open end of a container, forming at a plurality of widely separated areas, distributed as hereinafter set forth, a croze adapted to receive the cover and having an overlying shoulder and so distributing said areas that less than half the shoulders thus formed lie within an extent of more than half the periphery of the container, so that removal of said less than half the shoulders will permit removal of the cover, and forcibly depressing the cover against the walls of said shoulders compressing the said walls and forcing the cover within the croze against the underlying seating shoulder.

In testimony whereof, I have signed my name to this specification.

ROBERT G. FESSENDEN.